United States Patent [19]

Stumpe

[11] Patent Number: 4,557,527
[45] Date of Patent: Dec. 10, 1985

[54] ELECTRO-PNEUMATIC BRAKE SYSTEM

[75] Inventor: Werner Stumpe, Kornwestheim, Fed. Rep. of Germany

[73] Assignee: Robert Bosch GmbH, Stuttgart, Fed. Rep. of Germany

[21] Appl. No.: 676,605

[22] Filed: Dec. 3, 1984

Related U.S. Application Data

[63] Continuation of Ser. No. 415,213, Sep. 7, 1982, abandoned.

[30] Foreign Application Priority Data

Apr. 24, 1982 [DE] Fed. Rep. of Germany ....... 3215475

[51] Int. Cl.$^4$ .......................... B60T 8/02; B60T 13/74
[52] U.S. Cl. ........................................ 303/15; 251/14;
251/129.03; 303/28; 303/118; 303/119
[58] Field of Search ..................... 303/13–17,
303/6 R, 6 A, 118, 119, 20, 117, 61–63, 68–69,
50, 52, DIG. 1, 28, 40; 188/181 A, 181 R, 151
A; 251/129, 130, 14, 29, 30; 137/627.5

[56] References Cited

U.S. PATENT DOCUMENTS

| | | | |
|---|---|---|---|
| 1,786,234 | 12/1930 | Forman | 251/130 |
| 3,817,488 | 6/1974 | Mack | 251/130 X |
| 3,881,779 | 5/1975 | Machek | 303/118 |
| 4,077,674 | 3/1978 | Doto | 303/40 |
| 4,230,377 | 10/1980 | Goebels | 303/118 |
| 4,391,296 | 7/1983 | Abbott | 251/14 X |
| 4,400,039 | 8/1983 | Ogata | 303/15 X |

FOREIGN PATENT DOCUMENTS 1175049 7/1964 Fed. Rep. of Germany .
3215475 11/1983 Fed. Rep. of Germany ........ 303/15

Primary Examiner—Douglas C. Butler
Attorney, Agent, or Firm—Edwin E. Greigg

[57] ABSTRACT

An electro-pneumatic brake system with a pressure control valve switched ahead of the brake cylinders is proposed, which connects the brake cylinders either with outside air or with a storage tank. The pressure control valve is directly operable by an electro-magnet or, in the case of its loss, by an operating piston and is formed as a double-seat valve with large flow-through diameters. It can be combined with stop valves in order to make possible a multichannel pressure control. The compressed brake system is intended for use in motor vehicles, especially in utility vehicles.

14 Claims, 7 Drawing Figures

4,557,527

ELECTRO-PNEUMATIC BRAKE SYSTEM

RELATED PATENT APPLICATIONS

The following patent applications by the same assignee are related to this application. Application Ser. No. 411,139, filed Aug. 24, 1982; application Ser. No. 411,140, filed Aug. 24, 1982; and application Ser. No. 415,614, filed Sept. 3, 1982. This is a continuation of copending application Ser. No. 415,213 filed Sept. 7, 1982, now abandoned.

BACKGROUND OF THE INVENTION

The present invention is based on an electro-pneumatic brake system as revealed in the specification. Such a brake system is generally known (German Pat. No. 1,175,049).

In such a known brake system braking action is no longer possible after the magnet has failed. Even though it is also known to switch magnetic valves temporarily by hand (see U.S. Pat. No. 1,786,234), such a temporary switching is hardly feasible in the case of automotive brake systems.

OBJECT AND SUMMARY OF THE INVENTION

An electro-magnetic brake system with the characteristics as revealed hereinafter on the other hand, has the advantage that in the case of a loss of the electro-magnet the pressure control valve is immediately switchable by other means.

An especially advantageous use of the proposal of the invention is achieved if the pressure control valve in accordance with another characteristic of the present invention is used in dual-circuit brake systems. Because now the preferred primary control can be an electric control, while the pneumatic control is used only as an auxiliary control, which, however, is always used together with the other one, in order to have it continuously ready for use.

Another advantage of the apparatus according to the present invention is provided as follows: In the apparatus known from German Pat. No. 1.175.049 the pressure control valve is connected through a single control impulse, wherein for instance the outlet valve of a double-seat valve is closed and immediately thereafter the inlet valve is opened. This is highly disadvantageous in many switching modes, as for instance in a skid-control protective circuit, since no stop phase can be included. In contrast, however, it is possible to achieve a valve position with the apparatus of the present invention in which the inlet as well as the outlet valves are closed. With a double-seat valve controlled in such a way it is possible to achieve a safe anti-skid protection surveillance.

The invention will be better understood and further objects and advantages thereof will become more apparent from the ensuing detailed description of preferred embodiments taken in conjunction with the drawings.

BRIEF DESCRIPTION OF THE DRAWINGS

Several exemplary embodiments of the present invention are shown in the drawings and are explained in greater detail in the following description.

DESCRIPTION OF THE PREFERRED EMBODIMENT

Figure 1:
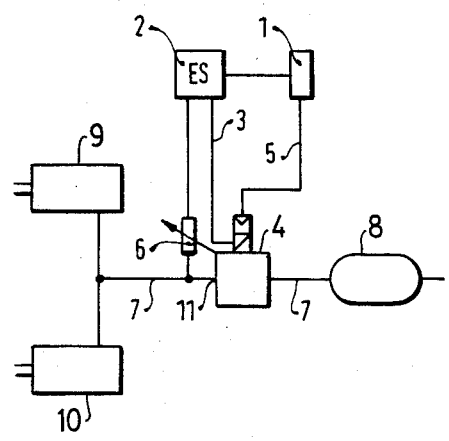
FIG. 1 shows schematically a first embodiment of a brake system.

An electro-pneumatic brake system has a dual-circuit brake value transducer 1 which is a dual control unit that controls both an electrical signal and a pneumatic fluid under pressure; by way of which an electrical sugnal from an electrical source, not shown as well as a pneumatic signal in the form of compressed air from a compressed air source, not shown; can be fed into the brake signal. The electrical system is route by way of an electronic circuit 2, to which is connected a pressure control valve 4 via an electrical line 3. A pneumatic line 5 also leads to this pressure control valve 4, and this line comes directly from the brake value transducer 1 which is a dual control unit that controls both an electrical signal and a pneumatic fluid under pressure. Finally a pressure sensor 6 is connected to the electronic circuit 2.

The pressure control valve 4 is placed into a line 7 leading from a storage tank 8 to two brake cylinders 9 and 10. The part of the line leading to the brake cylinders 9 and 10 can either have a single outlet 11 at the pressure control valve 4 (FIG. 1), or two outlets 12 and 13 (FIG. 2). For the remainder of the system, however, the exemplary embodiment in accordance with FIG. 2 is the same as that of FIG. 1. therefore it has the same reference numerals.

Figure 2:
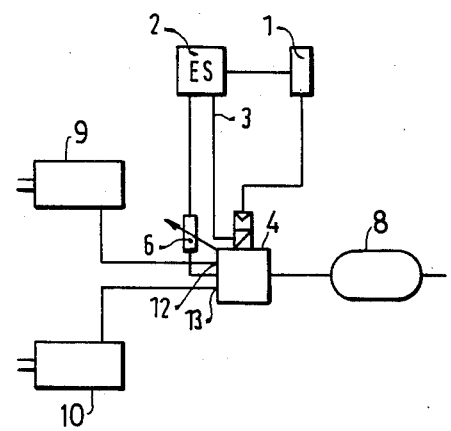
FIG. 2 shows schematically a second embodiment of a brake system.
Figure 3:
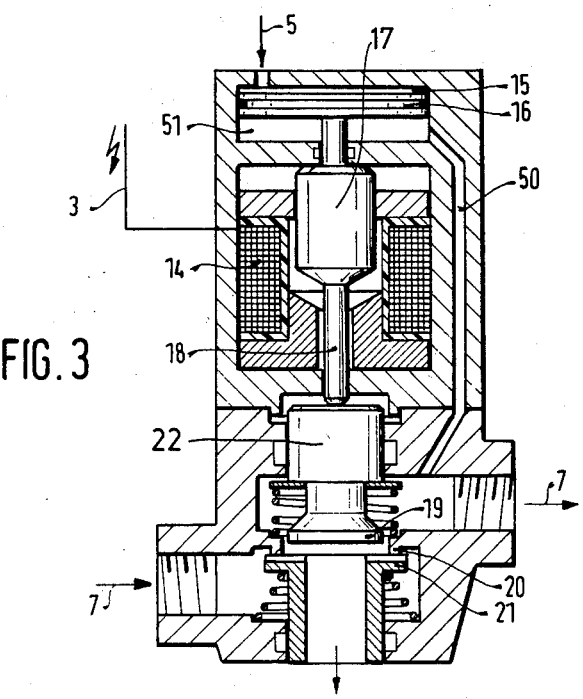
FIG. 3 is a cross-sectional view of a pressure control valve in the form of an ordinary switching valve controllable by a dual-circuit.

The pressure control valve 4 in accordance with the FIGS. 1 and 2 is shown in FIG. 3 in cross section. It can be seen that the electrical line 3 leads to a coil of an electromagnet 14 and the pneumatic line 5 leads into the work chamber 15 of an operating piston 16. The operating piston 16 and an armature 17 of the electro-magnet 14 are disposed coaxially behind each other. The armature 17 has a stem attachment 18 on its side which extends away from the operating piston 16, with which it can act upon an attachment 22 of a movable outlet seat of a double-seat valve 19, 20, 21.

A second seat, outlet seat 20, is fastened to the housing and a closing body 21 works together with both seats 19 and 20. Seats and closing body of the double-seat valve 19, 20, 21 are constructed in such a way that they can control large flow passages. The double-seat valve 19, 20, 21 monitors the connection of the line leading from the storage tank 8 to the brake cylinders 9, 10.

A connection 50 leads from the outlet 7 into a chamber 50 under the piston 16.

Mode of Operation

An electrical signal is emitted when the dual-circuit brake value transducer 1 is activated and this signal arrives at the electro-magnet 14 of the pressure control valve 4 by way of the electronic circuit 2 and the line 3. The magnet 14 can be excited in two steps, starting from a voltage potential of zero. In the first step (voltage potential 1), the double-seat valve 19, 20, 21 is switched to a central position, in which both valves, outlet valve 19/21 and inlet valve 20/21, are closed. In the second excitement step (voltage potential 2) the inlet valve 20/21 is opened. In this manner the pressure control valve 4 works as a 3/3 way magnetic valve. The pressure sensor 6 senses the pressure transmitted to the brake cylinders 9, 10 and passes this information on to the electronic circuit 2, which compares it with the information from the brake value transducer 1 and sets the voltage potential at the magnet 14 accordingly.

Immediately thereafter the working chamber 15 is pressurized by way of the pneumatic line 5 via the transducer 1 and the operating piston 16 performs a switching stroke because of the pressure admitted via the trnsducer 1; however, this movement has no effect on the brake because the electrical part of the system has already caused pressure, which counteracts the pressure in the work chamber 15 by way of line 50 in the chamber 51; if necessry, the electrical part of the system can correct the voltage potential in this way. If the electrical part fails, the switching stroke of the operating piston 16 by itself can accomplish the switching of the double-seat valve 19, 20, 21. This represents an emergency or auxiliary operation.

Figure 4:
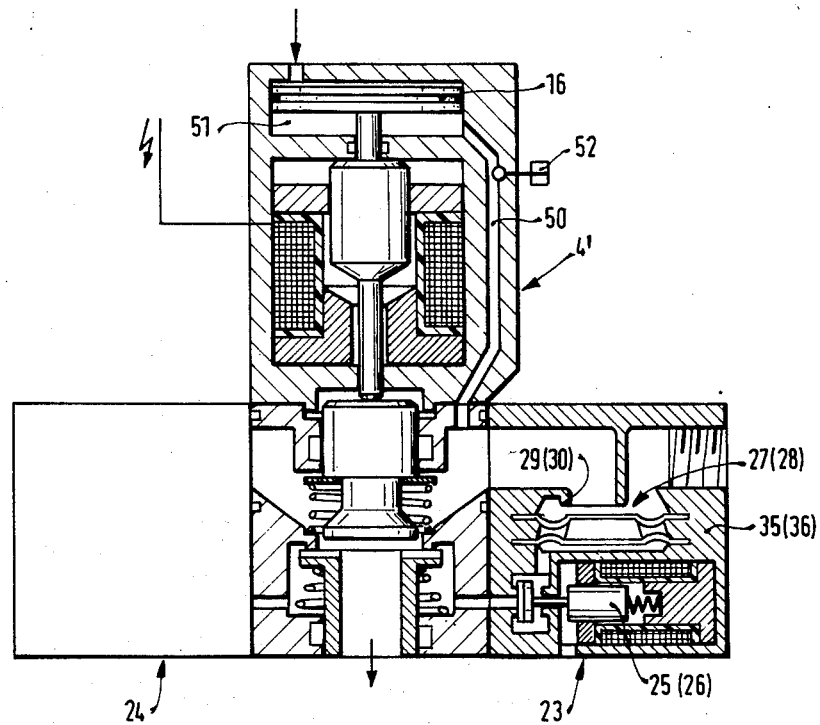
FIG. 4 is a cross-sectional view of a pressure control valve in an anti-skid protective circuit.

The construction in accordance with FIG. 4 shows, in essence, the same pressure control valve as in FIG. 3. Like parts therefore have the same reference numerals. The pressure control valve 4' shown here is combined with two stop valves 23 and 24 by flanging a valve housing 23 or 24 to the side of the housing of the pressure control valve 4'. Each stop valve 23 or 24 has, as a servo valve, an electromagnetic valve 25 or 26 as well as a 2/2 way main valve 27 or 28, which can hold open (position shown) or closed a valve seat 29 or 30. Furthermore, into the connection 50 to the chamber 51 a 2/2 way magnetic valve 52 is inserted, which monitors the connection of brake cylinder pressure to the chamber 51.

Such a combination is especially useful for an antiskid protective device, because in this case both 2/2 way main valves 27 and 28, in connection with the 3/3 way pressure control valve 4' make possible a dual-channel pressure control with a possibility for a slow, stepped raising of the pressure after the first pressure drop. For use as anti-skid protection, the operation of the operating piston 16 is cancelled by the switching of the magnetic valve 52.

Figure 5:
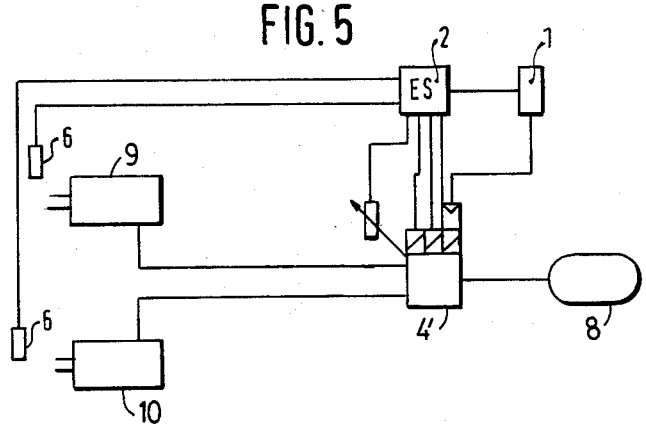
FIGS. 5 to 7 show schematically several combinations of the pressure control valve in an anti-skid protective system.

FIG. 5 shows, in association with FIGS. 2 and 3, a switching possibility which can be implemented with the construction in accordance with FIG. 4.

Figure 6:
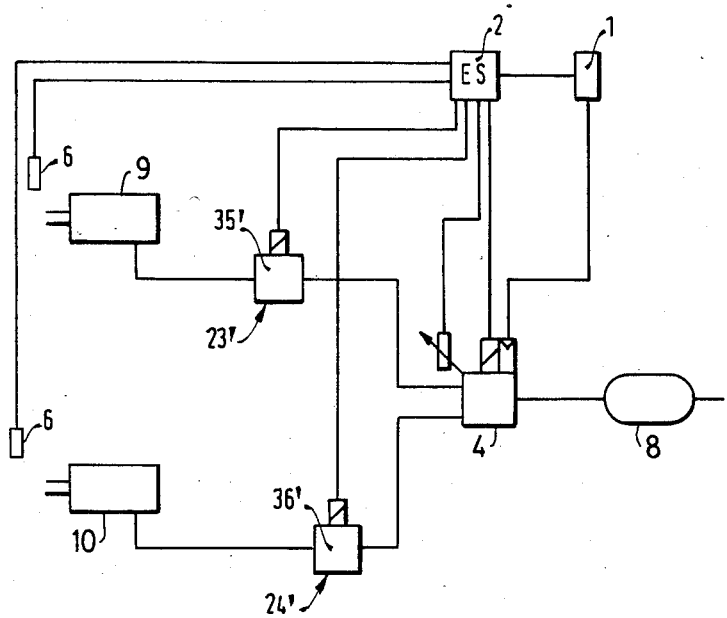
Figure 7:
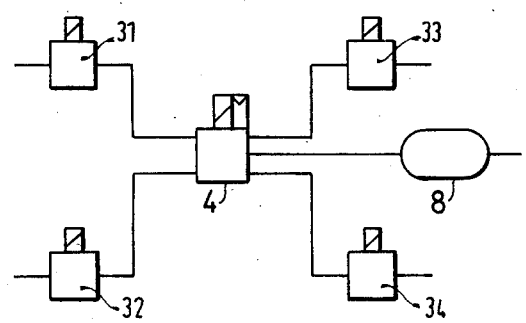

In the embodiment in accordance with FIG. 6 the stop valves 23' and 24' with their housings 35' and 36' are disposed separated from the pressure control valve 4; and FIG. 7 shows a four-channel circuit, in which four single stop valves 31, 32, 33, 34 are combined in one device together with the pressure control valve 4. In this manner four brake cylinders can be monitored separately.

A further switching possibility is achieved by disposing a pressure control 4' each for each of the brake cylinders to be influenced.

It becomes possible to directly control large amounts of air energy through the use of the pressure control valve 4, 4' in accordance with the present invention. The strain on the valve seats of the double-seat valve is minimal and can be calculated. The stop valves only come into action when the anti-skid protective device operates. This results in a favorable life expectancy in normal brake pressure control use.

In addition, the pressure control valve in accordance with the present invention is simple in construction, is small in size and guarantees a very good pressure output.

The foregoing relates to preferred exemplary embodiments of the invention, it being understood that other embodiments and variants thereof are possible within the spirit and scope of the invention, the latter being defined by the appended claims.

What is claimed and desired to be secured by letters patent of the United States is:

1. In an electro-pneumatic brake system including at least one storage tank and brake cylinders supplied thereby, which comprises a pressure control valve which controls air passage from said at least one storage tank to the brake cylinders, said pressure control valve including a body having an inlet and at least one outlet, a double-seat valve including a first valve seat on said body between said inlet and said at least one outlet and an axially aligned movable closing body, said movable closing body including a central passage and a second valve seat on an end thereof, a portion of which seats against said first valve seat to separate said inlet from said at least one outlet, an axially aligned attachment within said valve body operable to seat against said second valve seat on said closing body thereby closing said central passage and adapted to move said movable closing body away from said first valve seat, an electromagnet secured to said valve body, said electro-magnet including an armature with a stem attachment in axial alignment with said attachment which exerts a force on said movable closing body for directly controlling said movable closing body in accordance with an electrical current applied to said electromagnet, and a compressed air operating piston means in axial alignment with said armature, said piston means including an axially aligned stem and operative to exert a force on said armature for movement of said armature relative to said attachment and said movable closing body of said double-seat valve in the event said electromagnet is inoperative whereby said double seat valve is operated by said armature by application of an electrical current to said electro-magnet and in the event said electrical current is inoperative, said compressed air operated piston will physically move said armature for operation of said double-seat valve.

2. A brake system according to claim 1 wherein said doubleseat valve is actuated together with the electromagnetic actuation.

3. A brake system according to claim 1 wherein said double-seat valve is actuated by said compressed air operating piston following the electromagnetic actuation.

4. A brake system in accordance with claim 1, further comprising, a dual circuit means having a dual-circuit brake value transducer for controlling said pressure control valve and an electric control for said electromagnet for operating as a primary control for said system.

5. A brake system in accordance with claim 4, wherein said electro-magnet comprises means for being excited in two discrete levels of potential, and said double-seat valve has a means defining a magnetically controlled center position in which both single valve means of the double-seat valve are closed.

6. A brake system in accordance with claim 5, wherein said armature of the electro-magnet is stressed by said compressed air operating piston in a position in which the armature is in the current-actuated end position of the electro-magnet.

7. A brake system in accordance with claim 1, wherein said electro-magnet comprises means for being excited in two discrete levels of potential, and said double-seat valve has a means defining a magnetically controlled center position in which both single valve means of the double-seat valve are closed.

8. A brake system in accordance with claim 7, wherein said armature of the electro-magnet is stressed by said compressed air operating piston in a position in which the armature is in the current-actuated end position of the electro-magnet.

9. A brake system in accordance with claim 8, further comprising an anti-skid protective means, pressure stop valve means, wherein the pressure control valve is combined with said pressure stop value means.

10. A brake system in accordance with claim 1, wherein said armature of the electro-magnet is stressed by said compressed air operating piston in a position in which the armature is in the current-actuated end position of the electro-magnet.

11. A brake system in accordance with claim 10, further comprising an anti-skid protective means, pressure stop valve means, whereby the pressure control valve is combined with said pressure stop valve means.

12. A brake system in accordance with one of claim 1, further comprising an anti-skid protective means, pressure stop valve means, whereby the pressure control valve is combined with said pressure stop valve means.

13. A brake system in accordance with claim 12, wherein said pressure stop valve means comprises means flanged to a housing means for the pressure control valve.

14. A brake system in accordance with claim 12, wherein the pressure stop valve means comprises means inserted into the lines leading to the brake cylinders.

* * * * *